Patented Sept. 30, 1952

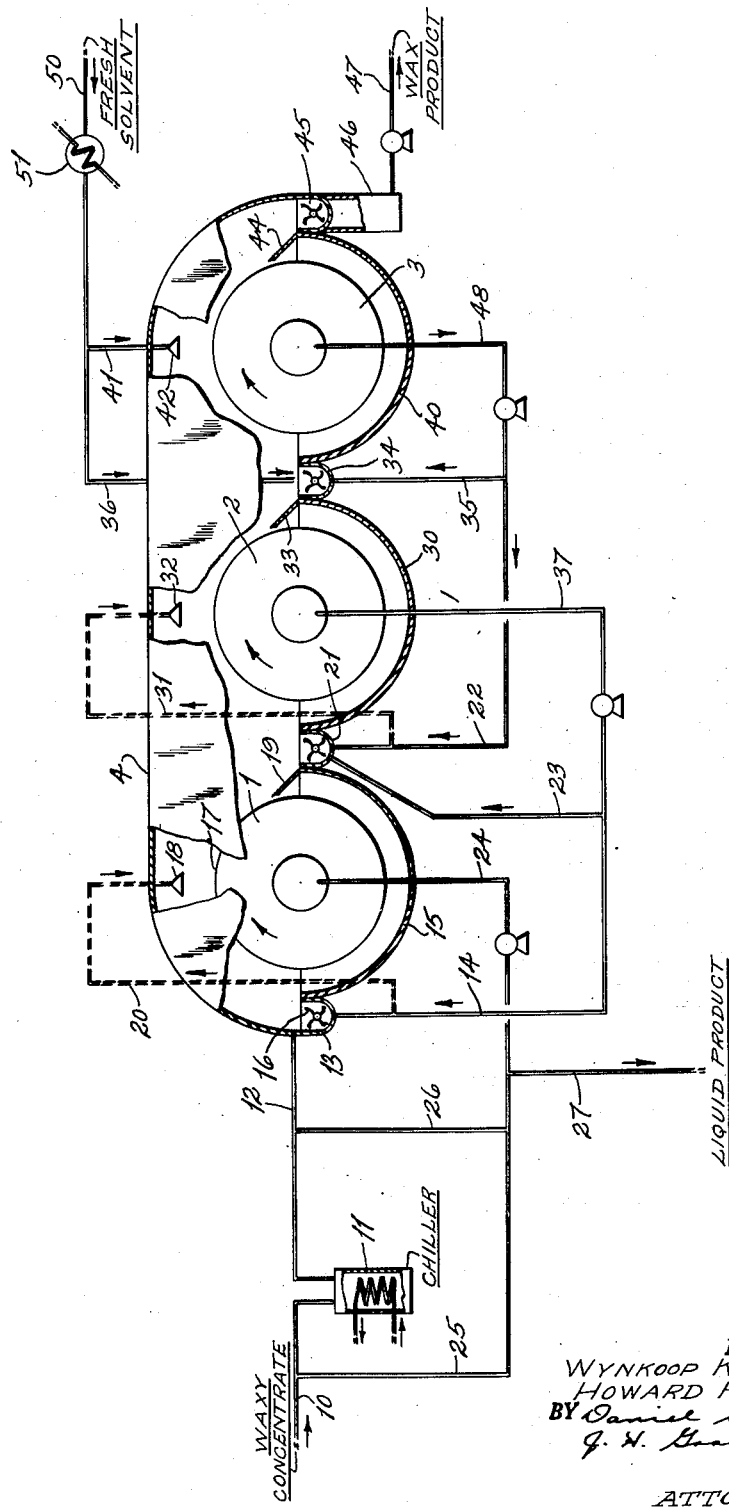

2,612,466

UNITED STATES PATENT OFFICE 2,612,466

CONTINUOUS VACUUM FILTRATION

Wynkoop Kiersted, Jr., Scarsdale, and Howard H. Gross, Pleasantville, N. Y., assignors to Texaco Development Corporation, New York, N. Y., a corporation of Delaware Application April 21, 1948, Serial No. 22,416

5 Claims. (Cl. 196—20)

This invention relates to continuous vacuum filtration for the separation of solids from a feed mixture of solids and liquids such as the separation of wax from mixtures of wax and oil, as, for example, the separation of wax from wax concentrates or from oil containing a high percentage of wax. The invention is particularly useful for deoiling wax or for the separation of wax in substantially oil-free form from wax concentrates or slack waxes such as are produced in dewaxing mineral oil to produce low pour test lubricating oil.

The invention broadly contemplates effecting the filtration in a plurality of filters arranged for series flow wherein solids obtained as filter cake from a preceding filter stage are conducted to a succeeding stage, and filtrate from this succeeding stage is commingled with the solids passing to the preceding stage. Fresh solvent is commingled with solids passing to the final filter stage. The desired solid product is discharged as filter cake from the final filter stage, while liquid product dissolved in solvent is discharged as filtrate from the initial filter stage. In this way, there is countercurrent movement of solids and solvent through the system. Advantageously, a portion of the filtrate from a succeeding filter stage is used as wash solvent for cake washing in a preceding stage.

The invention contemplates employment of a multifilter operation with relatively small diameter, high rotating speed vacuum drum filters, preferably enclosed within a common housing or compartment, the interior of which is maintained at the desired filtering temperature. Vacuum rotary drum filters are described in Reissue Patent 22,646, granted May 29, 1945 to W. Kiersted, one of the present joint applicants, and in Patent 2,337,385, granted December 21, 1943 to H. H. Gross, the other joint applicant. As used in conventional dewaxing operations, such filters usually have drums approximately ten feet in diameter which drums rotate slowly at 0.1 to 1.0 revolution per minute.

The filter drums employed in the present invention are only about four or five feet in diameter and may be driven by separate drives with a drum speed ranging from about 2 to 15, and usually 10 to 15 revolutions per minute, for example.

Filtrate formed during filter cake deposition and also during cake washing and drying is removed as one stream from a succeeding filter, and conducted to a preceding filter, as already indicated, and as will be discussed in more detail later.

The atmosphere within the common housing surrounding the rotating filter drums, when treating waxy concentrates, is maintained at a predetermined filtering temperature usually in the range below normal room temperature. Substantially the same temperature prevails in each filter.

Very high rates of filtration are possible in the deoiling of waxes or in the separation of wax from wax concentrates by means of our invention. Such high rates are not feasible in a conventional commercial filter operation. Furthermore, more effective separation between solids and liquid is secured by our invention with materially less solvent. Substantially oil-free wax cake is obtained from the final filter stage notwithstanding the high filter rotation rates.

Conventional dewaxing solvent liquid or liquid mixtures may be employed. For example, a solvent liquid mixture containing about 40% methyl ethyl ketone and 60% commercial benzol, by volume, may be employed. Other ketones, as well as other polar organic chemical compounds, may be used as a wax anti-solvent liquid. Also, other aromatic hydrocarbons, or mixtures thereof, may be used as an oil solvent. Individual solvent compounds may be used instead of a mixture of wax antisolvent and oil solvent liquids. In some cases, low boiling hydrocarbons and liquefied normally gaseous hydrocarbons may be used as the solvent.

Reference will now be made to the accompanying drawing to facilitate further description of the invention as applied to the separation of a selected portion such as a high melting point fraction of the wax from a slack wax obtained by dewaxing lubricating oil stock to produce low pour test oil and employing a solvent consisting of about 40% methyl ethyl ketone and 60% commercial benzol.

As indicated in the drawing, the system comprises three rotary drum vacuum filters 1, 2 and 3. These filters are indicated merely in outline. Detailed diagrammatic views are believed unnecessary inasmuch as the filters in question may be generally similar in design and construction to those described in the aforesaid Kiersted and Gross patents, the essential difference being that they have small diameter drums rotating at about 10 to 15 revolutions per minute, and are enclosed within a common housing or hood 4 instead of in individual hoods as disclosed in the patents in question.

The slack wax, as produced in a conventional dewaxing operation, is associated with a substantial amount of dewaxing solvent liquid. This retained dewaxing solvent liquid may be distilled from the slack wax in which case the resulting solvent-free slack wax may be at an elevated temperature of about 200° F. It will contain a mixture of waxes each having its own melting point and other characteristics peculiar to itself. It may be desired to recover as a wax product about 50 to 90% of the wax constituents which range in melting points from about 120 to 140° F. The hot slack wax is conducted through pipe 10 wherein it is mixed with a portion of the filtrate obtained from the first filter 1.

As indicated in the drawing, this filtrate is discharged from the filter 1 (operating at a temperature of about 30° F.) through a pipe 24 communicating with branch pipes 25 and 26. This filtrate contains about 8% low melting point wax and oil and about 92% solvent by volume.

About five volumes of this filtrate are diverted through pipe 25 for mixing with each volume of the hot slack wax feed flowing through the pipe 10. Since the recycled filtrate is at a temperature of about 30° F., it will impart cooling to the slack wax feed, reducing its temperature to about 60° F.

The partially cooled mixture is conducted through a chiller 11 wherein the temperature is reduced to about 30° F., the filtration temperature prevailing in the filter system.

Advantageously, a further quantity of the foregoing filtrate is diverted through pipe 26 and commingled with the chilled slack wax mixture flowing through the pipe 12. This further quantity of filtrate is added in the proportion of about five volumes per volume of slack wax feed.

If desired, all of the recycled filtrate may be added, in small increments, to the slack wax feed during chilling. At any rate, the resulting chilled mixture of slack wax and recycled filtrate is conducted from the pipe 12 into a mixing trough 13 wherein it is commingled with filtrate obtained from the secondary filter 2 and introduced to the trough through pipe 14. This secondary filtrate contains about 99% solvent and 1% low melting point wax and oil by volume, and is added in the proportion of about two volumes per volume of wax concentrate feed passing through pipe 10.

The amount of filtrate from filter 1 commingled with the slack wax feed is correlated with the amount of secondary filtrate injected into the trough 13, so that the resulting cooled mixture undergoing filtration in filter 1 will comprise about 15 volumes of liquid phase per one volume of solid phase, thereby providing a mixture from which is obtained a filter cake that can be effectively washed in situ. This same ratio of liquid phase to solid phase is advantageously maintained in each succeeding filter stage.

The trough extends horizontally the full length of the filter bowl 15, and may be substantially similar to the conventional trough into which the resulting wax cake discharges from the filter at the opposite side of the filter bowl. The trough is provided with a mixing paddle 16 mounted on a horizontal shaft rotatively supported within the trough 13.

It is, of course, contemplated that in lieu of this mixing trough, other mixing means, such as a separately stirred vessel or tank, may be provided within or without the filter chamber or housing for effecting this mixing of cold secondary filtrate with the wax concentrate feed.

The resulting cold commingled mixture overflows from the trough 13 into the interior of the filter bowl 15. The edge of the trough may be serrated or provided with V notches to facilitate uniform distribution of flow into the filter bowl. For that matter, the lip of the trough may be lower than the surface of the liquid in the filter bowl.

Within the filter bowl 15, a filter cake of wax is formed on the submerged portion of the rotating drum 17. As shown, the drum 17 rotates in a clockwise direction. During continued rotation, the filter cake emerges from the filtering mixture and passes under the wash spray or sprays 18 by which means the filter cake is subjected to washing in situ.

The wash liquid comprises a portion of the secondary filtrate being recycled through the previously mentioned pipe 14. Thus, the recycled filtrate, used for washing and comprising about 99% solvent, is diverted through a pipe 20 communicating with the aforesaid spray 18. This wash liquid is used in the proportion of about 2 volumes per volume of wax concentrate charge passing through pipe 10.

Ultimately, the washed and dry filter cake is discharged from the rotating drum 1 over a deflector 19 into a second trough 21 similar to trough 13 previously described. In trough 21, the primary wax cake is commingled with filtrate obtained through pipe 22 from the third filter in the series. This filtrate consisting of solvent containing about 0.25% dissolved wax and oil is added in the proportion of about 4 volumes per volume of fresh wax concentrate feed.

Some secondary filtrate from the second filter may also be introduced from pipe 23 into the trough 21 in the proportion of about eight volumes of secondary filtrate per volume of wax concentrate initially charged.

The resulting commingled mixture overflows into the filter bowl 30 of the succeeding filter 2 wherein it undergoes filtration in a manner similar to that in the preceding filter.

The secondary wax cake is likewise subjected to washing, but, in this instance, is washed with a portion of the filtrate from the third filter, the necessary quantity for washing being diverted from pipe 22 through pipe 31 to wash spray 32. The volume of wash liquid used in this stage amounts to about two volumes per volume of wax concentrate originally charged. The filtrate from the third filter consists essentially of solvent, as previously indicated.

The resulting washed and dried secondary filter cake is discharged over the deflector 33 into a trough 34.

In the trough 34, the secondary wax cake is commingled with filtrate from the third filter introduced from a pipe 35 in the proportion of about eight volumes of tertiary filtrate per volume of wax concentrate initially charged.

In addition, fresh solvent in the proportion of about two volumes per volume of wax concentrate initially charged is introduced through pipe 36 into the trough 34 for commingling with the secondary wax cake.

The resulting commingled mixture is then passed into the filter bowl 40 of the third filter wherein it is subjected to filtration in a manner similar to that prevailing in the preceding filters. The resulting cake is also washed in situ with fresh solvent liquid introduced through pipe 41 to wash spray 42 in the proportion of about two volumes per volume of wax concentrate initially charged.

The resulting cake, after drying, is discharged from the rotating drum 3 of deflector 44 into trough 45 from which it is discharged into a receiver 46. It is pumped from the receiver 46 through discharge pipe 47. The discharged wax product will comprise a mixture of about equal volumes of wax and solvent, the wax component having a melting point of about 125° F. The solvent can be stripped from the wax by conventional means leaving a substantially oil-free wax, that is, wax containing less than 0.1% oil by volume.

As indicated, the fresh solvent is admitted to the system from a source not shown through a pipe 50 and chiller 51 wherein it is cooled to about 30° F., the filtering temperature prevailing in each of the filters of the system. Normally, the fresh solvent enters the system only by way of the third filter stage. However, fresh solvent may be added, as a supplemental or auxiliary supply, at any point where recirculated filtrate is used.

The filtrate from the third filter discharges from the filter valve through pipe 48 from which it is pumped to a preceding point in the system as already explained. Likewise, the filtrate from the secondary filter 2 is discharged through pipe 37 from which it is pumped to preceding points in the system as previously indicated. The filtrate from the filter 1 is discharged through pipe 24 communicating with pipes 25 and 26 through which it is added, in part, to the initial wax concentrate charge, the remainder being discharged through pipe 27 as an end product comprising a mixture of soft wax and oil having a melting point of 100 to 105° F. and mixed with a large proportion of solvent. Thus, the stream discharged through pipe 27 may comprise about 30 volumes of waxy oil and 330 volumes of solvent.

Accordingly, it is seen from the foregoing description of the invention that the total amount of fresh solvent employed both as diluent and as wash for the filter cake amounts to four volumes per volume of slack wax feed entering the system through pipe 10. This represents a material advantage over previous practice wherein the same slack wax feed is subjected to recrystallization and repulping and employing conventional filter operations. In the latter case, the amount of fresh solvent required to obtain a final filter cake of low oil content is materially greater and may be at least five times as great as that required in the foregoing example. Moreover, the final filter cake obtained by these conventional filter operations would still contain more oil than the final filter cake obtained in the foregoing example.

In the foregoing example, reference has been made to employing a slack wax feed from which the dewaxing solvent has been stripped. It is contemplated, however, that the slack wax feed may retain the solvent normally associated with it as obtained from a conventional solvent dewaxing filtration operation. In such case, and since such conventional dewaxing operations are usually carried out at a temperature of 0° F. and below, the resulting slack wax and solvent mixture may be obtained at a temperature ranging from about 0 to +40° F. It may thus be obtained at a temperature substantially below the filtering temperatures prevailing in the multi-filter system. In this case, chilling in the chiller 11 is unnecessary. Instead, it may be necessary to pass the mixture through an exchanger to raise the temperature to the desired filtering temperature. Moreover, when the slack wax is obtained at low temperature and partially diluted with the dewaxing solvent, the recycled primary filtrate may be added at a single point, for example, prior to passage through the aforesaid heat exchanger.

While mention has been made of processing waxy oil and wax concentrates derived from mineral oil, nevertheless, it is contemplated that the invention is applicable to the treatment of wax-like mixtures derived from other than petroleum sources as, for example, animal and vegetable oils.

Filtering temperatures will depend on the nature of the charge mixture. In the case of wax concentrates, these will range from about 0° F. to 65° F., for example.

While three filter units have been described in the drawing, two or even more than three may be used. Advantageously, they are all maintained at substantially the same temperature, the entire system being installed within a single compartment.

Obviously many modifications and variations of the invention as above set forth may be made without departing from the spirit and scope thereof, and therefore only such limitation should be imposed as are indicated in the appended claims.

We claim:

1. A method of separating high melting point wax from a wax concentrate obtained in dewaxing wax-bearing lubricating oil stock, said concentrate comprising a mixture of high melting point wax, low melting point wax and a small amount of oil, by continuous filtration in the presence of solvent liquid in a series of at least three rotary drum vacuum filter stages at a temperature in the range of 65° F. and lower, each filter drum being about four to five feet in diameter, wherein filter cake from a preceding stage is charged to a succeeding stage and filtrate from a succeeding stage obtained during cake deposition in that stage is commingled with charge passing to a preceding stage, which comprises rotating each filter drum at a peripheral speed substantially in excess of 32 feet per minute but at a rotational speed not greater than about 15 R. P. M., filtering in the initial stage of said series a commingled mixture of fresh concentrate and filtrate from an intermediate stage in the series to form an initial filtrate containing solvent and oil and an initial filter cake containing mainly wax and solvent, discharging initial filtrate, commingling with said initial filter cake, prior to charging to the next stage in series, filtrate obtained from a stage succeeding said next stage, filtering the resulting commingled mixture containing initial filter cake in said next stage thereby forming intermediate filtrate containing solvent and low melting point wax and an intermediate filter cake containing an increased concentration of high melting point wax, said intermediate filtrate being recycled at least in part to the stage immediately preceding said intermediate stage, commingling intermediate filter cake with fresh solvent liquid, filtering this last mentioned commingled mixture in the aforesaid succeeding stage thereby forming a final filter cake containing product wax and a final filtrate containing solvent plus a small amount of low melting point wax, discharging the final filter cake, recycling final filtrate at least in part to an intermediate stage for mixing with intermediate filter feed, and maintaining each filter stage at substantially the same temperature.

2. A method according to claim 1 in which each drum is rotated at about 10 to 15 revolutions per minute.

3. A method according to claim 1 in which the filter cake formed in each stage, except the final stage in the series, is washed, in situ, with filtrate produced in the stage succeeding that in which it is formed.

4. A method according to claim 1 in which the mixture undergoing filtration in each stage comprises about 15 volumes of liquid phase per one volume of solid phase.

5. A method according to claim 1 in which substantially all of the fresh solvent liquid is supplied to the final filter stage of the series.

WYNKOOP KIERSTED, Jr.
HOWARD H. GROSS.

REFERENCES CITED

The following references are of record in the file of this patent:

UNITED STATES PATENTS

| Number | Name | Date |
|---|---|---|
| 1,922,730 | Gore et al. | Aug. 15, 1933 |
| 1,986,762 | Rembert et al. | Jan. 1, 1935 |
| 2,221,993 | Oswald | Nov. 19, 1940 |
| 2,341,045 | Kiersted, Jr. | Feb. 8, 1944 |
| 2,446,514 | Stewart et al. | Aug. 3, 1948 |
| 2,486,014 | Evans | Oct. 25, 1949 |